(12) United States Patent
Moritz et al.

(10) Patent No.: US 11,732,793 B2
(45) Date of Patent: *Aug. 22, 2023

(54) GEARED MOTOR

(71) Applicant: SEW-EURODRIVE GMBH & CO. KG, Bruchsal (DE)

(72) Inventors: Thorsten Moritz, Ubstadt-Weiher (DE); Dorothee Wieczorek, Bretten (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,175

(22) Filed: Sep. 6, 2022

(65) Prior Publication Data

US 2022/0412448 A1 Dec. 29, 2022

Related U.S. Application Data

(63) Continuation of application No. 17/262,829, filed as application No. PCT/EP2019/025227 on Jul. 11, 2019, now Pat. No. 11,434,989.

(30) Foreign Application Priority Data

Jul. 24, 2018 (DE) .......................... 102018005800.0

(51) Int. Cl.
*F16H 57/038* (2012.01)
*F16H 1/22* (2006.01)
*F16H 57/02* (2012.01)

(52) U.S. Cl.
CPC ........... *F16H 57/038* (2013.01); *F16H 1/222* (2013.01); *F16H 2057/02017* (2013.01); *F16H 2057/02034* (2013.01); *F16H 2057/02073* (2013.01)

(58) Field of Classification Search
CPC ......... F16H 57/038; F16H 2057/02017; F16H 2057/02034; F16H 2057/02073; F16H 1/222

See application file for complete search history.

(56) References Cited

U.S. PATENT DOCUMENTS 2,270,980 A * 1/1942 Tidball ..................... F16H 57/03
74/606 R
5,203,231 A 4/1993 Minegishi et al.
(Continued)

FOREIGN PATENT DOCUMENTS

CN 111140643 A * 5/2020 ............. B60K 17/12
DE 69206433 T2 5/1996
(Continued)

OTHER PUBLICATIONS

International Search Report issued in corresponding International Application No. PCT/EP2019/025227, dated Sep. 30, 2019, pp. 1-2, English Translation.

(Continued)

*Primary Examiner* — Thomas C Diaz
(74) *Attorney, Agent, or Firm* — Carter, Deluca & Farrell LLP

(57) ABSTRACT

A geared motor includes a gear unit having a first intermediate shaft, an input shaft and an output shaft. The gear unit has two connection surfaces set apart from each other to which a device to be driven by the gear unit is connectable to the gear unit, each connection surface having a drilling pattern. The housing part is asymmetrical such that the plane whose normal direction is aligned in parallel with the axis of rotation of the first intermediate shaft and includes the axis of rotation of the input shaft, is no plane of symmetry in relation to the entire outer surface of the housing part and also no plane of symmetry in relation to the housing wall of (Continued)

the housing part. The plane is a plane of symmetry with regard to the two connection surfaces together with their drilling patterns.

28 Claims, 14 Drawing Sheets

(56) References Cited

U.S. PATENT DOCUMENTS

| | | | |
|---|---|---|---|
| 5,875,690 | A | 3/1999 | Cognigni et al. |
| 9,157,508 | B2 | 10/2015 | Allgaier et al. |
| 2006/0156861 | A1* | 7/2006 | Yamasaki ............... F16F 15/10 |
| | | | 74/606 R |
| 2008/0264202 | A1 | 10/2008 | Mineshima |
| 2015/0128759 | A1* | 5/2015 | Schnurr ............... F16H 57/033 |
| | | | 74/606 R |

FOREIGN PATENT DOCUMENTS

| | | | |
|---|---|---|---|
| DE | 69709471 | T2 | 8/2002 |
| DE | 102007014707 | A1 * | 9/2008 ........... F16H 57/032 |
| DE | 102007014707 | A1 | 9/2008 |
| DE | 102010004485 | A1 | 8/2010 |
| DE | 102013012718 | A1 | 2/2015 |
| EP | 2653752 | A1 | 10/2013 |
| JP | 2001103710 | A | 4/2001 |
| JP | 2001323967 | A | 11/2001 |
| WO | 2011066915 | A1 | 6/2011 |

OTHER PUBLICATIONS

Formigine "Helical bevel geared motors" Motovario heart of Motion, (machine translation completed on Jan. 7, 2019) pp. 1-18.

* cited by examiner

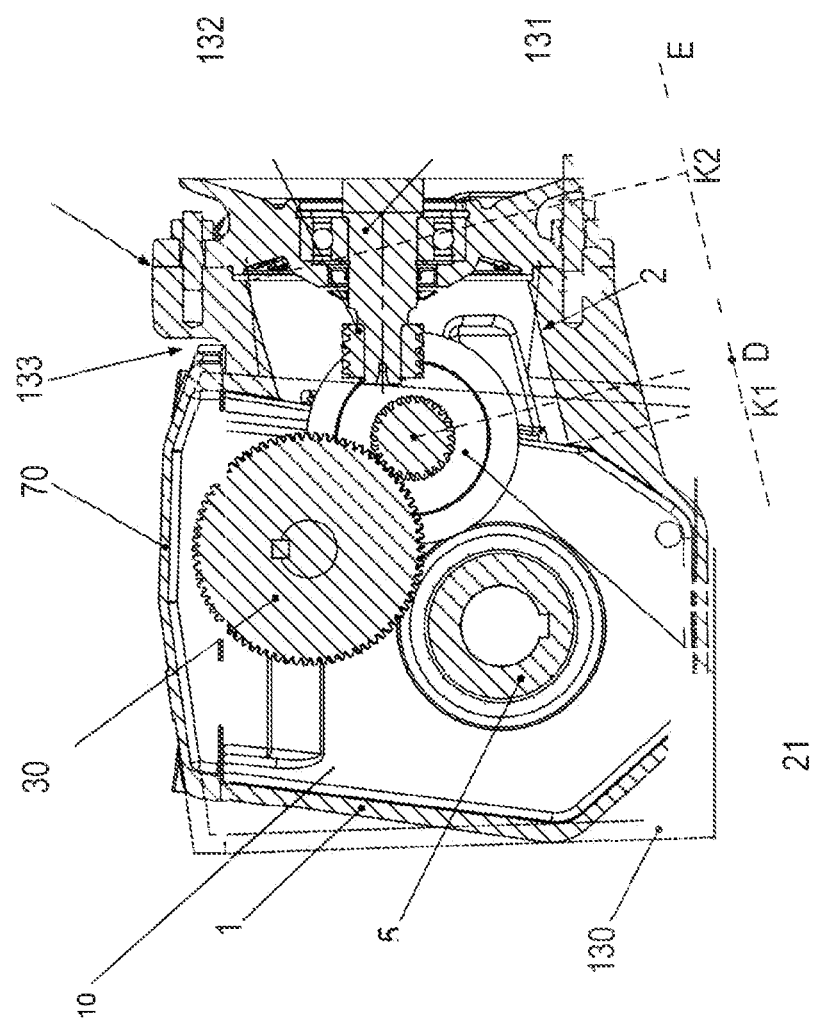

GEARED MOTOR

CROSS-REFERENCE TO RELATED APPLICATIONS

The present application is a continuation of U.S. patent application Ser. No. 17/262,829, which is the national stage of PCT/EP2019/025227, having an international filing date of Jul. 11, 2019, and claims priority to Application No. 102018005800.0, filed in the Federal Republic of Germany on Jul. 24, 2018, each of which is expressly incorporated herein in its entirety by reference thereto.

FIELD OF THE INVENTION

The present invention relates to a geared motor.

BACKGROUND INFORMATION

In a conventional die casting method for the production of metallic parts, sliders are moved in a linear manner, i.e., pulled out, during the demolding.

SUMMARY

Example embodiments of the present invention provide a geared motor having a compact form.

According to an example embodiment of the present invention, a geared motor has a gear unit, in particular a bevel gear unit, which is able to be driven by an electric motor. The gear unit has a first intermediate shaft rotatably mounted with the aid of bearings in the housing part, and an input shaft, in particular, and an output shaft. The housing part has an asymmetrical configuration such that the particular plane whose normal direction is aligned in parallel with the axis of rotation of the first intermediate shaft and includes the axis of rotation of the input shaft is no plane of symmetry in relation to the entire outer surface of the housing part and also no plane of symmetry in relation to the housing wall of the housing part. The plane, however, is a plane of symmetry with regard to the two connection surfaces together with their drilling patterns, the output shaft in particular being situated in parallel with the first intermediate shaft.

This offers the advantage that the housing part is able to be placed tightly around the toothed parts and the gear unit can therefore have a compact configuration. In addition, only a small interior volume space thus has to be provided in the gear unit. Nevertheless, the same device is able to be connected on the output side at both connection surfaces in each case. This is so because the drilling patterns of the two connection surfaces are arranged in mutual symmetry, with the result that the device to be connected is able to be connected to both connection surfaces in the same manner.

The connection surfaces are aligned in parallel with each other and in parallel with the plane of symmetry.

Additional characteristics of the mechanical interfaces achieved with the aid of the two connection surfaces are also arranged in the same manner. For example, the two connection surfaces include centering device(s) such as a centering collar or centering edge, which are also arranged in symmetry with each other. The output-side centering of the respective device to be driven thus also is arranged and/or provided in a symmetrical fashion.

According to example embodiments, a load to be driven has a second part, which is rotatably mounted with respect to a first part of the load. The housing part has a first drilling pattern on a first outer side and a first centering device, in particular a centering collar, a centering edge, and/or a centering groove. The housing part has a second drilling pattern on a second outer side and a second centering device, in particular a centering collar, a centering edge, and/or a centering groove. For example, the first and second outer sides are axially set apart from each other in relation to the axis of rotation of the output shaft. The first and second drilling patterns are arranged in the same manner, in particular in an identical manner, and/or the first and the second centering devices are arranged in the same manner, in particular in an identical, manner. For example, the first and second outer sides with the first and the second drilling pattern are symmetrical in relation to the plane of symmetry, in particular the plane. Optionally, the second part is able to be connected in a torsionally fixed manner to the first axial end region of the hollow shaft, and the first part is able to be connected to the housing part at the first drilling pattern and first centering device, or the second part is able to be connected in a torsionally fixed manner to the second axial end region of the hollow shaft, and the first part is able to be connected to the housing part at the second drilling pattern and second centering device.

This offers the advantage that a load of the same type may be connected on both sides, that is to say, the A-side and/or the B-side, using the same mechanical interface despite the asymmetrical configuration of the housing part. The connection measurements, the drill holes of the drilling pattern for connection screws, and the centering devices are of the same type on the output A-side and B-side.

According to example embodiments, the geared motor, which has a gear unit, in particular, a bevel gear, able to be driven by an electric motor of the geared motor, has a housing part, which is produced by a die casting method, during or after which sliders are moved, in particular pulled out, in the respective drawing directions for the demolding, and an input shaft. The housing part has a channel, demolded in a first drawing direction, in particular using a first slider, the channel being arranged to extend through the wall of the housing and ending in the interior space region of the gear unit, the drawing direction having a non-vanishing angle in relation to the axis of rotation of the input shaft, the angle in particular amounting to between 5° and 45°, in particular to between 5° and 20°.

This has the advantage that the ring gear meshing with the pinion of the input shaft projects at least partially into the channel, in particular more than half of the ring gear projecting into the channel. This makes it possible to provide the gear unit a very compact manner.

According to example embodiments, the gear unit is a bevel gear, and a tooth system, in particular of a pinion, which is connected to the input shaft in a torsionally fixed manner, meshes with the tooth system of a ring gear, the ring gear being connected to a first intermediate shaft of the gear unit in a torsionally fixed manner. The orthogonal projection of the axis of rotation of the first intermediate shaft onto the drawing direction, in particular onto a plane including the drawing direction, is included in the particular region that is covered by the orthogonal projection of the channel onto the drawing direction, in particular onto the plane including the drawing direction. This has the advantage that the ring gear projects into the channel by more than half.

According to example embodiments, the inner diameter of the channel is larger than the largest outer diameter of the ring gear. This is considered advantageous insofar as the channel is wide enough to at least partially accommodate the ring gear.

According to example embodiments, the housing part has a region which is demolded in a second drawing direction, in particular using a second slider, the second drawing direction having a non-vanishing angle to the normal direction of the plane defined by the axis of rotation of the input shaft and the axis of rotation of the first intermediate shaft, its amount in particular ranging from 5° to 45°, in particular from 5° to 20°. This has the advantage that the gear unit cover may be arranged shorter, and the interior space region of the gear unit is able to have a smaller configuration so that less lubricating oil is required in the gear unit because the housing wall of the housing part extends closer to the toothed parts.

According to example embodiments, the channel extends through a flange region of the gear unit, the gear unit, in particular, being connected to the electric motor at the flange region. This offers the advantage that the gear unit is fastened via the output-side flange region to a non-rotatably disposed region of the load to be driven, which means that no foot areas are required and/or need to be machined. The flange region on the output side thus also functions as a torque support.

According to example embodiments, the housing part is connected to a gear unit cover, the connection surface having a planar configuration, the gear unit cover being connected to the housing part with the aid of screws, the connection surface being parallel to the axis of rotation of the input shaft and parallel to the axis of rotation of the intermediate shaft, the screws, in particular their helix axis direction, being aligned in parallel with the second drawing direction, and a flat seal in particular being placed between the housing part and the gear unit cover. This has the advantage that the screws take up little space in the wall of the housing part, or in other words, the wall thickness in the region of the threaded bores in the housing part provided for the screws is kept to a minimum. This is so because the drawing direction of the wall of the housing part is parallel with the helix axis direction of the screws. It is considered disadvantageous in this context that the screws are not guided through the connection surface in a perpendicular manner but the threaded bores have to be introduced into the housing part at a corresponding angle in relation to the connection surface.

According to example embodiments, the screw is guided through a respective stepped bore of the gear unit cover and screwed into a respective threaded bore by its threaded region, the bore, in particular the stepped bore, and the threaded bore being aligned in parallel with the second drawing direction in each case, in particular, the screw head of the respective screw resting against the cover surface in a planar manner, in particular against the step of the respective stepped bore. This offers the advantage that the stepped bore is also aligned in parallel with the drawing direction. When the bore is not implemented as a stepped bore, the screw head rests against the cover surface of the gear unit cover. When the bore is implemented as a stepped bore, on the other hand, the screw is provided with a countersunk screw head.

According to example embodiments, the bore, in particular the stepped bore, is introduced into a planar surface region of the gear unit cover, the normal direction of the planar surface region being aligned in parallel with the second drawing direction. This offers the advantage that the bore implemented as a stepped bore is introduced perpendicular to the surface region.

According to example embodiments, the housing part has an asymmetrical configuration such that the particular plane whose normal direction is aligned in parallel with the axis of rotation of the first intermediate shaft and which includes the axis of rotation of the input shaft, is no plane of symmetry. This offers the advantage that material and interior space volume, that is to say, oil volume as well, is able to be saved on the side of the plane facing away from the output wheel.

According to example embodiments, the housing part has an asymmetrical configuration such that the toothed part, in particular the gear wheel, which is connected to the output shaft of the gear unit in a torsionally fixed manner, is set apart from the plane, in particular, a greater share of the volume of the interior space region of the gear unit is situated on the side of the plane facing the toothed part than is situated on the side of the plane facing away from the toothed part. This is considered advantageous insofar as the housing part can be arranged so that the interior space region on the side facing away from the output wheel has a smaller volume than on the side of the plane facing the output wheel and/or than on the side of the plane including the output wheel.

According to example embodiments, the output shaft is situated so as to be axially accessible from both sides, the output shaft in particular being arranged as a hollow shaft. This has the advantage that a shaft to be driven is connectable, in particular insertable, on both sides. The output shaft may also be arranged as a solid shaft.

According to example embodiments, the housing part is produced as an aluminum die cast part. This has the advantage that the gear unit has a low mass and the motor therefore has to generate only a low holding force.

According to example embodiments, the housing part has the same mechanical interface for a load to be driven by the gear unit, in particular by the output shaft, axially on both sides of the output shaft. Thus, a first interface, in particular, is provided on the housing part for the connection to a load to be driven by the front axial end region of the output shaft, and a second interface is provided on the housing part for the connection to a load to be driven by the rear axial end region of the output shaft, the first interface and the second interface being identical. The interface includes a drilling pattern situated on the housing part and a centering means situated on the housing part. This offers the advantage that the load to be driven is axially connectable on both sides in the same manner. However, when the load is situated closer to the output wheel, higher transverse forces and bending moments are able to be absorbed than when the load is situated at a greater distance from the output wheel. This is so because on the side of the plane facing the output wheel, the housing wall is situated closer to the output wheel than the axially opposite housing wall is situated from the output wheel. The bearings of the output shaft accommodated in the respective housing wall are therefore also situated at a corresponding distance.

However, if the load on the side of the plane facing away from the output wheel is connected to the gear unit, the greater distance to the end wheel induces a higher torsion and greater elasticity at the output shaft due to the greater axial length, and thus results in a less rigid connection, which leads to a correspondingly different vibration behavior and to a different vibration tendency.

Further features and aspects of example embodiments of the present invention are described in greater detail below with reference to the appended schematic Figures.

BRIEF DESCRIPTION OF THE DRAWINGS

In addition to FIG. 13, FIG. 14 illustrates the orthogonal projection D of the axis of rotation of the first intermediate shaft into a plane E, which includes the drawing direction of channel 2, and also the orthogonal projection (K1 to K2) of channel 2, so that it can be understood that D is included in of the projection of channel 2.

DETAILED DESCRIPTION

Figure 1:
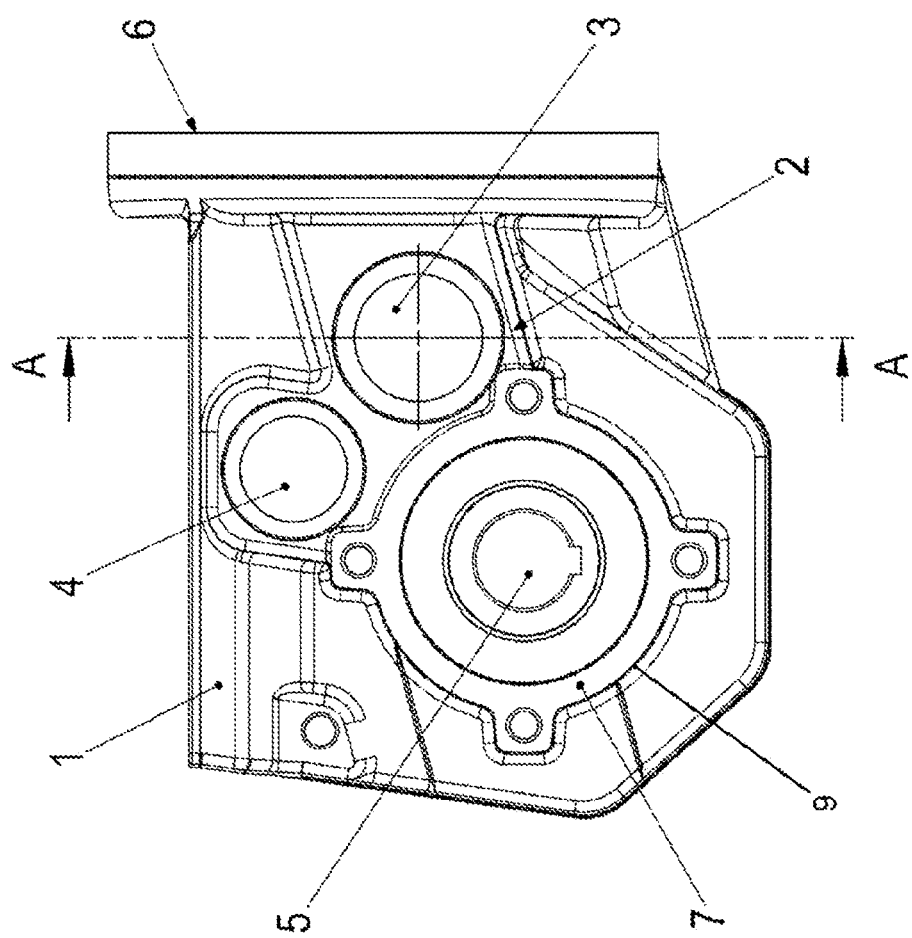
FIG. 1 is a side view of a housing part 1 of a gear unit according to an example embodiment of the present invention.

As schematically illustrated in the Figures, housing part 1, in particular produced from aluminum by a die casting process, has a channel 2, which extends from the environment into the interior space region of the gear unit. Channel 2 is the demolding region of a first slider in the die cast production of housing part 1. As a result, channel 2 is a subregion of the particular space region required and/or traversed by the first slider during the pull-out operation.

As mentioned above, the housing part has a region 10 that is demolded in a second drawing direction. The drawing direction of the first slider, i.e., the channel direction, has a non-vanishing angle with respect to the input shaft of the gear unit. Therefore, the drawing direction does not extend in parallel with the input shaft. The amount of this non-vanishing angle has a value of between, e.g., 5° and 45°, and, for example, of between 5° and 20°.

During the die casting production, a second slider is pulled out in a drawing direction that has a non-vanishing angle to the particular direction aligned orthogonal to the direction of the input shaft, in particular to its axis of rotation, and orthogonal to the direction of the output shaft, in particular its axis of rotation.

Since the gear unit is a bevel gear, input shaft 20, in particular, its axis of rotation, is directed perpendicular to output shaft 5, in particular, to its axis of rotation.

The drawing direction of the second slider thus has a non-vanishing angle to the particular direction that lies perpendicular to the axis of rotation direction of the input shaft and perpendicular to the axis of rotation direction of output shaft 5. The amount of this non-vanishing angle has a value of between, e.g., 5° and 45°, and, for example, of between 5° and 20°.

Connected to the input shaft in a torsionally fixed manner is a toothed part, in particular a pinion, or as an alternative, a tooth system is arranged on the input shaft. Meshing therewith is a toothed part 21, in particular a ring gear, which is situated on an intermediate shaft 20 of the gear unit in a torsionally fixed manner. This intermediate shaft 20 is rotatably mounted with the aid of bearings, the bearings being accommodated in housing part 1. The bearing mounts of the bearings are covered by a cover part 3, in particular, a cover cap in each case. Cover part 3 also provides oil-tight sealing from the environment.

Figure 2:
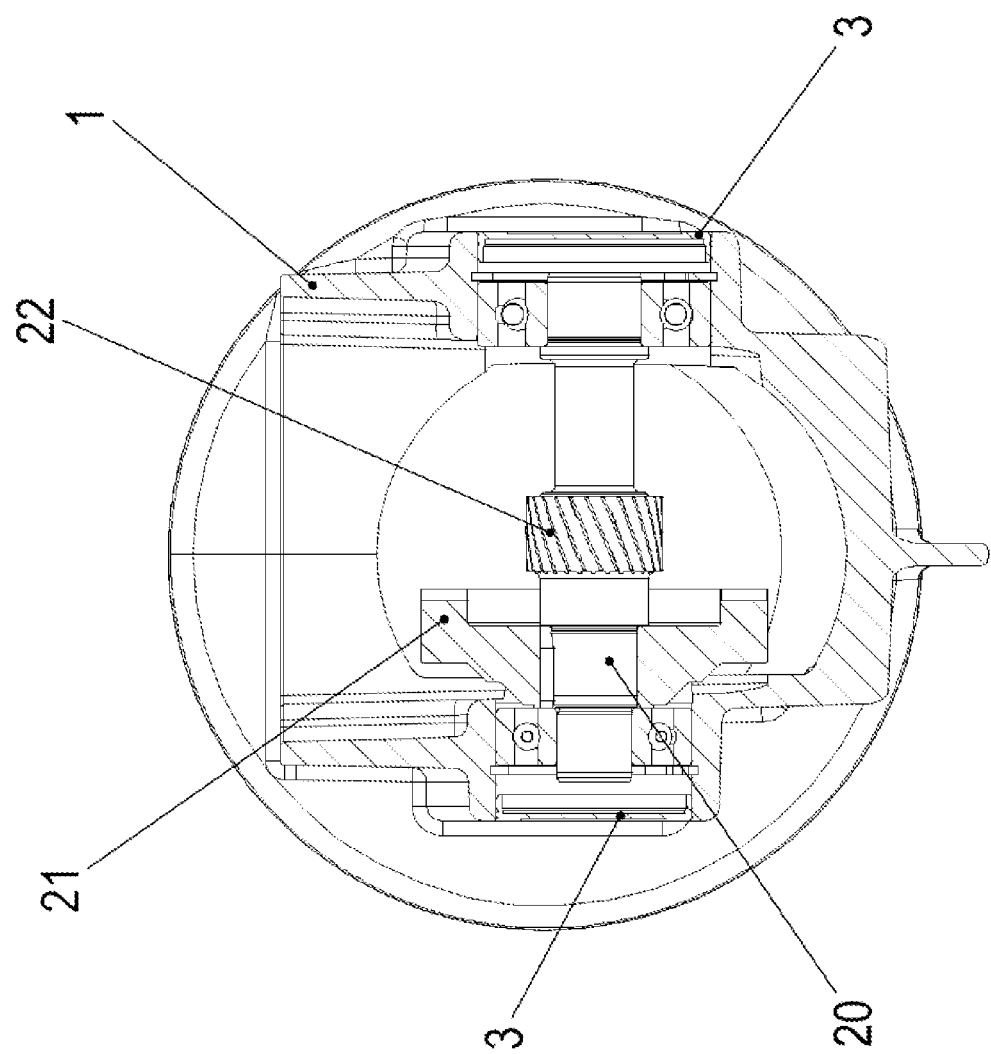
FIG. 2 is a cross-sectional view taken along lines A-A shown in FIG. 1.

As illustrated in FIG. 2, intermediate shaft 20 is connected in a torsionally fixed manner to tooth system 22.

The intermediate shaft also has a tooth system 22, which thus is connected to intermediate shaft 20 in a torsionally fixed manner and meshes with a tooth system or with a toothed part of a further shaft of the gear unit.

The input shaft projects into channel 2. The input shaft is connected in a torsionally fixed manner to the rotor shaft of the electric motor or arranged in one piece, i.e., in an integral fashion, with the rotor shaft of the electric motor. As illustrated in FIG. 1, the orthogonal projection of the channel into a plane including the drawing direction of the first slider includes the orthogonal projection of the axis of rotation of toothed part 21, in particular, the ring gear. In particular, it includes more than half of the orthogonal projection of entire toothed part 21.

This is illustrated in FIG. 1 because the center point of sealing cap 3 lies inside channel 2 rather than outside of it in an orthogonal projection onto the edge of the channel. This is also illustrated by the orthogonal projection D in FIG. 14, which illustrates the projection of the center point into a plane E situated in parallel with the drawing direction.

This perpendicular projection (K1 to K2) is included by the orthogonal projection of channel 2.

Toothed part 21 thus projects into channel 2, or more specifically, more than half of toothed part 21 projects into channel 2.

The likewise oblique drawing direction of the second slider makes it possible to achieve a reduced oil volume because the wall of housing part 1 is resting closer against the toothed parts than in the case of drawing directions of the sliders that are not slanted, that is to say, drawing directions of the sliders that are orthogonal with respect to one another.

Channel 2 penetrates flange region 6 and terminates in the environment. When the electric motor is installed, the opening produced in this manner is sealed because the housing of the electric motor is connected to flange region 6 of housing part 1, in particular by screws.

The gear unit is arranged without foot regions and the electric motor is held via the connection between flange region 6 and the housing of the electric motor. In an advantageous manner, this connection thus also functions as a torque support for the motor. The gear-unit motor having the electric motor and gear unit is held via output-side flange region 7, which is connected to a non-rotatably situated region of the load to be driven.

Figure 3:
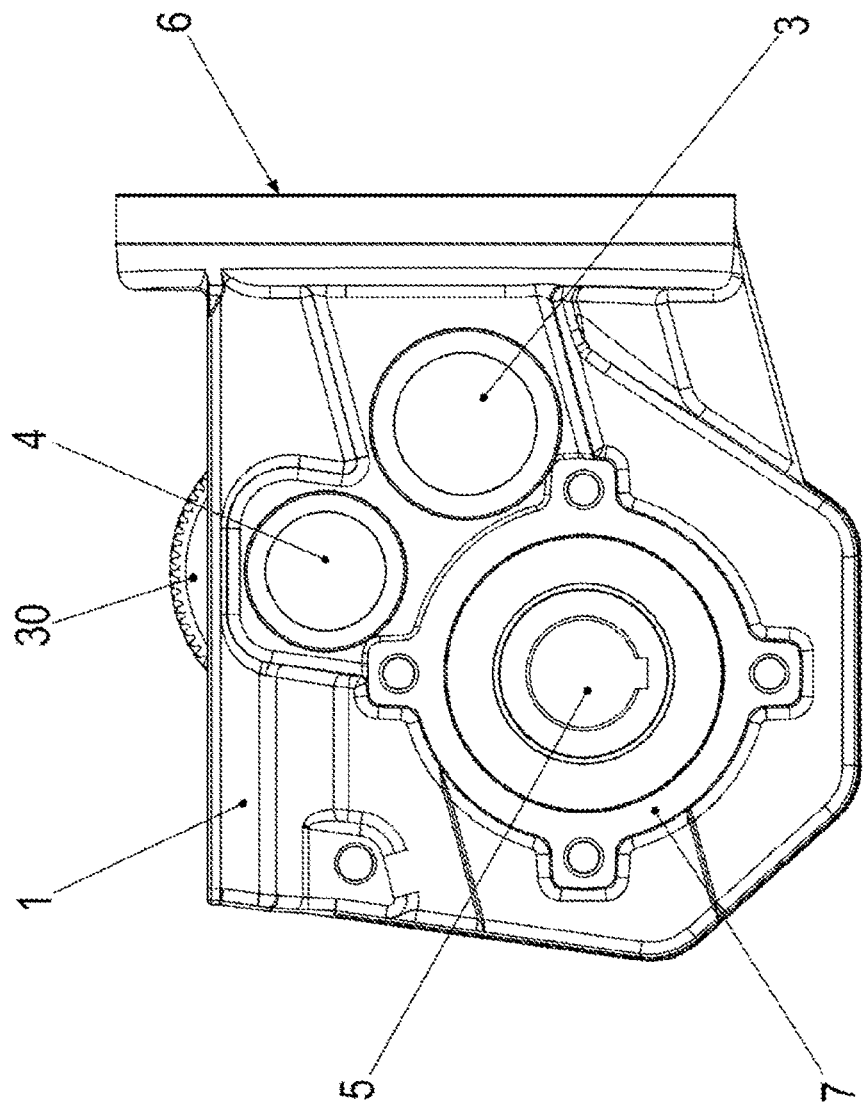
FIG. 3 illustrates the housing part filled with toothed parts.

FIG. 3 is a side view of the gear unit with gear unit cover 70 being lifted. Toothed part 30, connected to a further intermediate shaft in a torsionally fixed manner, thus partially projects from the interior space region of the gear unit.

As illustrated in the rear view, i.e., top view with a viewing direction counter to the input shaft, the gear unit has an asymmetrical configuration. This is because plane 42 whose normal direction is aligned in parallel with the axis of rotation of output shaft 5 and which includes the axis of rotation of the input shaft, is no plane of symmetry.

Figure 4:
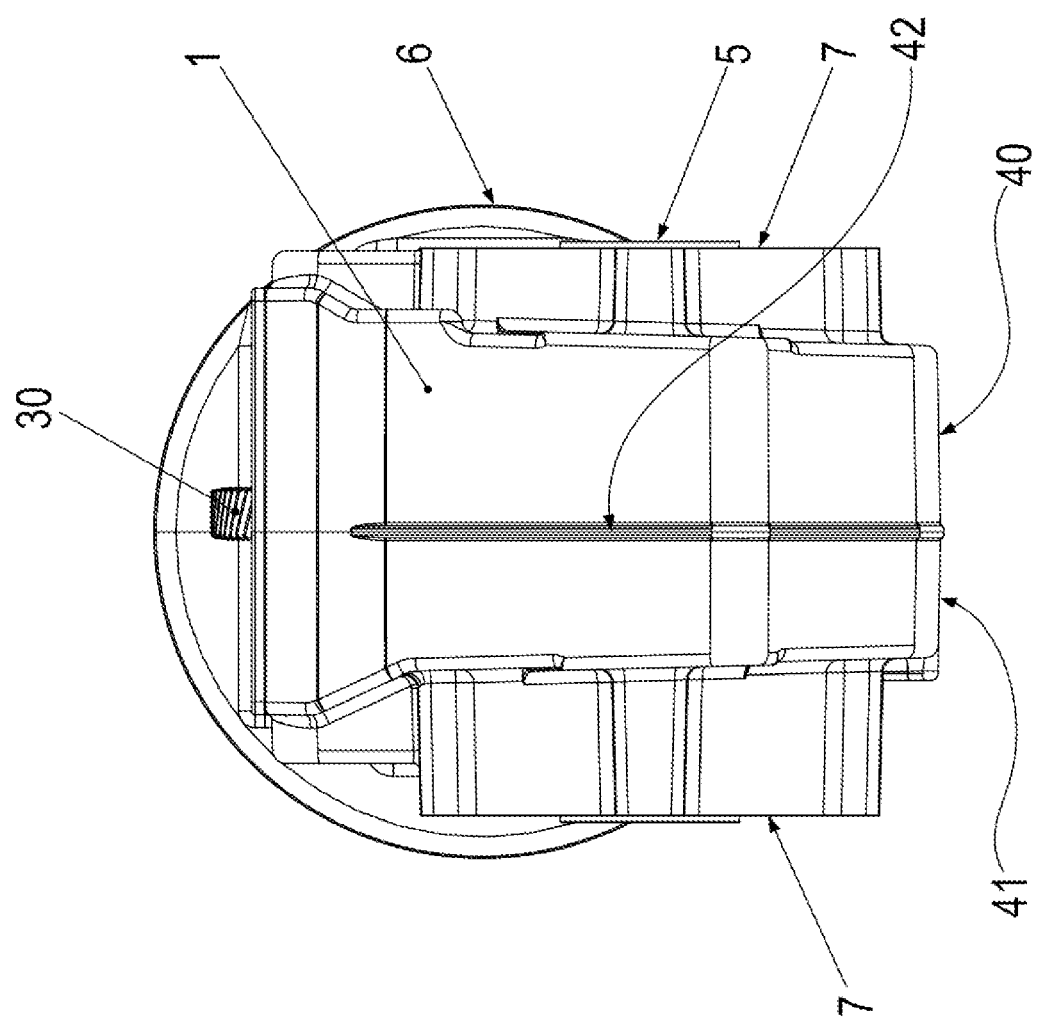
FIG. 4 is an associated rear view.

In FIG. 4, in particular, a larger share of the volume of the interior space region of the gear unit is located in region 40, that is to say, to the right of plane 42, rather than in region 41, i.e., to the left of plane 42. The portion of the interior space region situated to the right of plane 42 also accommodates the output wheel, i.e., the toothed part connected to output shaft 5 in a torsionally fixed manner.

Figure 5:
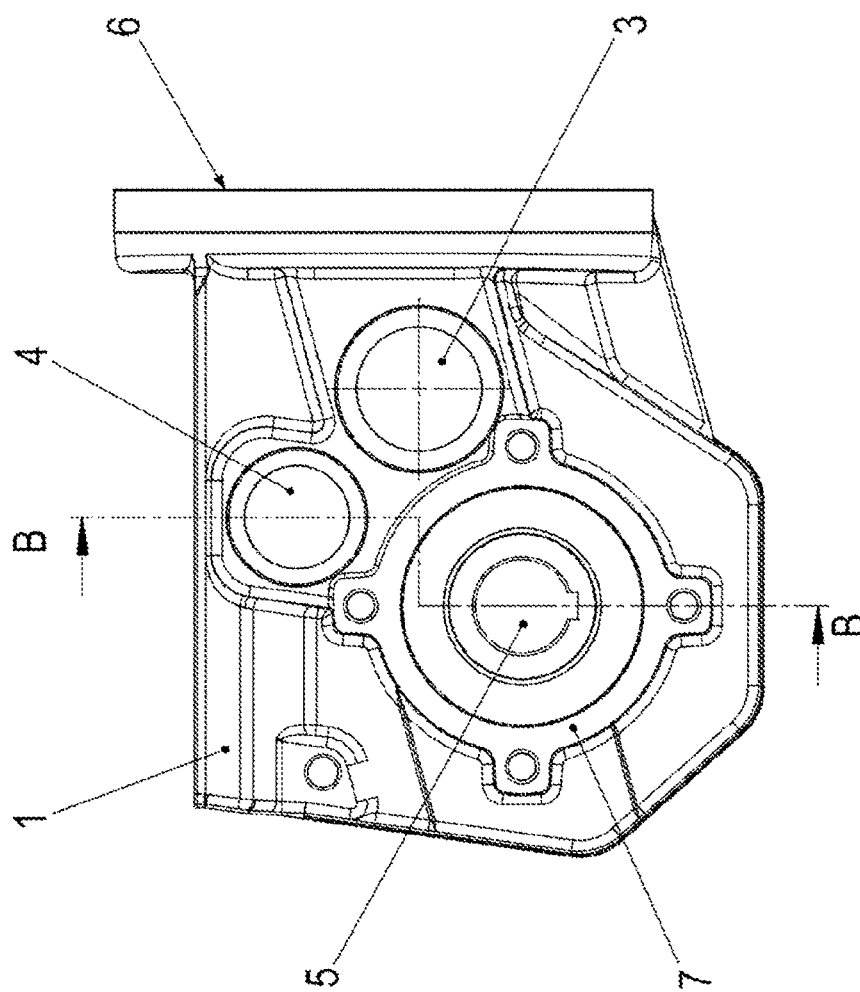
FIG. 5 indicates a cross-sectional line B-B.
Figure 6:
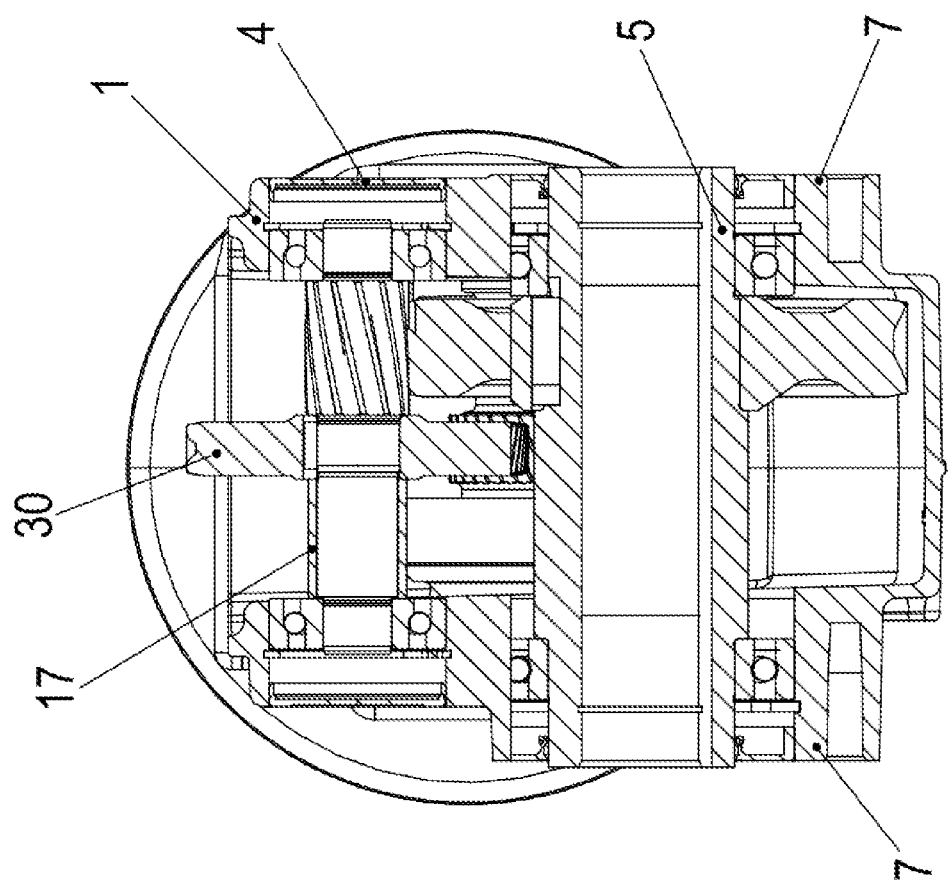
FIG. 6 is a cross-sectional view taken along lines B-B.

FIG. 5 illustrates the sectional line relevant for the cross-section according to FIG. 6. FIG. 6 illustrates that the output wheel is situated to the right of the plane. In the same manner, the intermediate shaft, covered by cover part 4, in particular, the sealing cap, in the direction of the environment, is provided with a tooth system with which the output wheel meshes.

As illustrated, output shaft 5 is situated so as to be axially accessible from both sides. Output shaft 5 is implemented as a hollow shaft, in particular.

Housing part 1 has an asymmetrical configuration such that the output wheel is set apart from plane 42. As a result, more lubricating oil and a greater share of the interior space region of the gear unit is situated on the side of plane 42 facing the output wheel than is situated on the side of plane 42 facing away from output wheel.

Figure 7:
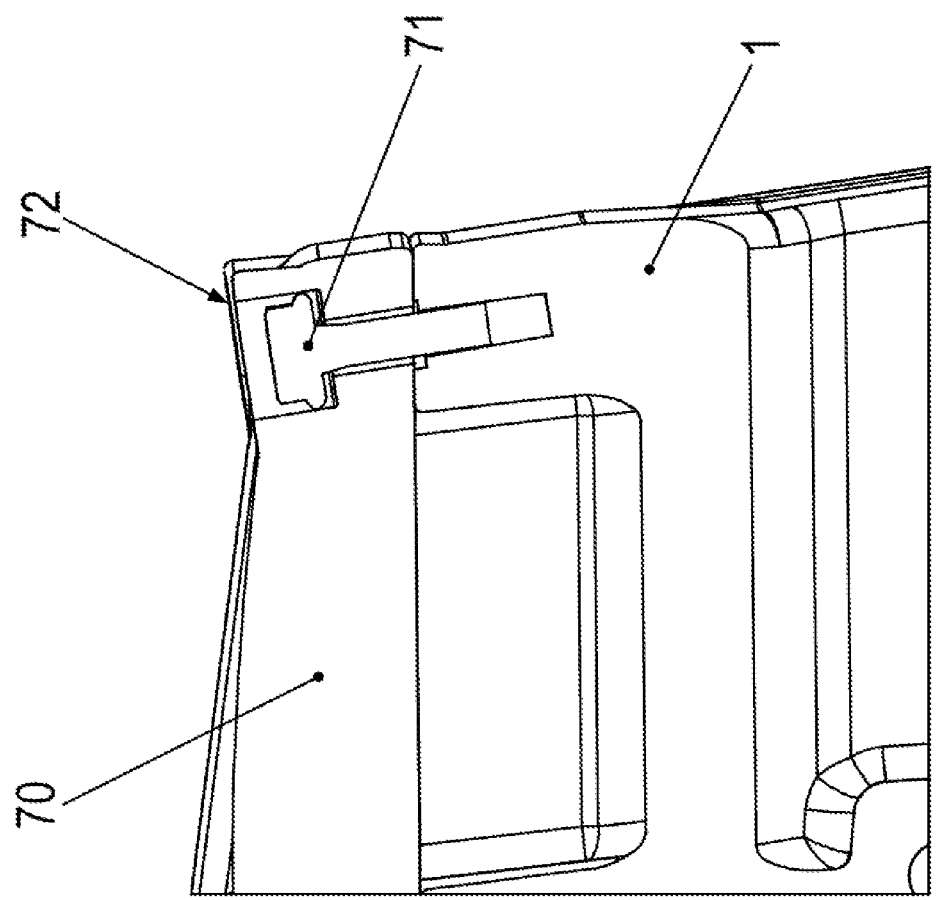
FIG. 7 is an enlarged view from the connection region between a gear unit cover 70, placed on housing part 1, to housing part 1.

As illustrated in FIG. 7, gear unit cover 70 is screwed to housing part 1 with the aid of screws 71.

Since the wall thickness of the housing part is constant, in particular, in the vicinity of the contact region between housing part 1 and gear unit cover 70, the wall of housing part 1 extends in parallel with the drawing direction.

Screws 71 are thus also aligned in parallel with this drawing direction. The normal direction of the planar connection surface between gear unit cover 70 and housing part 1 is therefore not aligned in parallel with the helix axis of screws 71.

Figure 9:
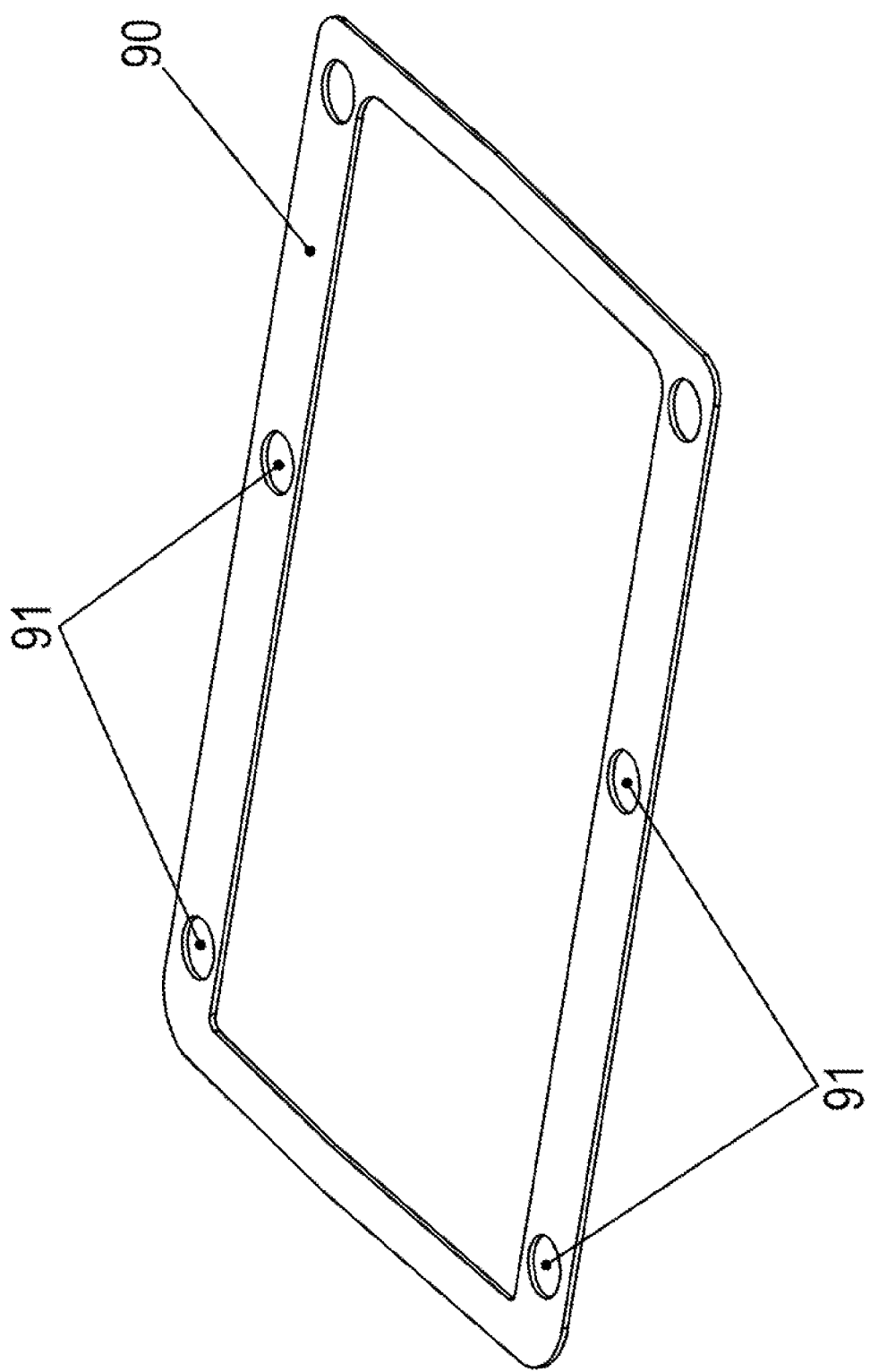
FIG. 9 is a perspective view of a flat seal 90, which is situated between gear unit cover 70 and housing part 1.
Figure 10:
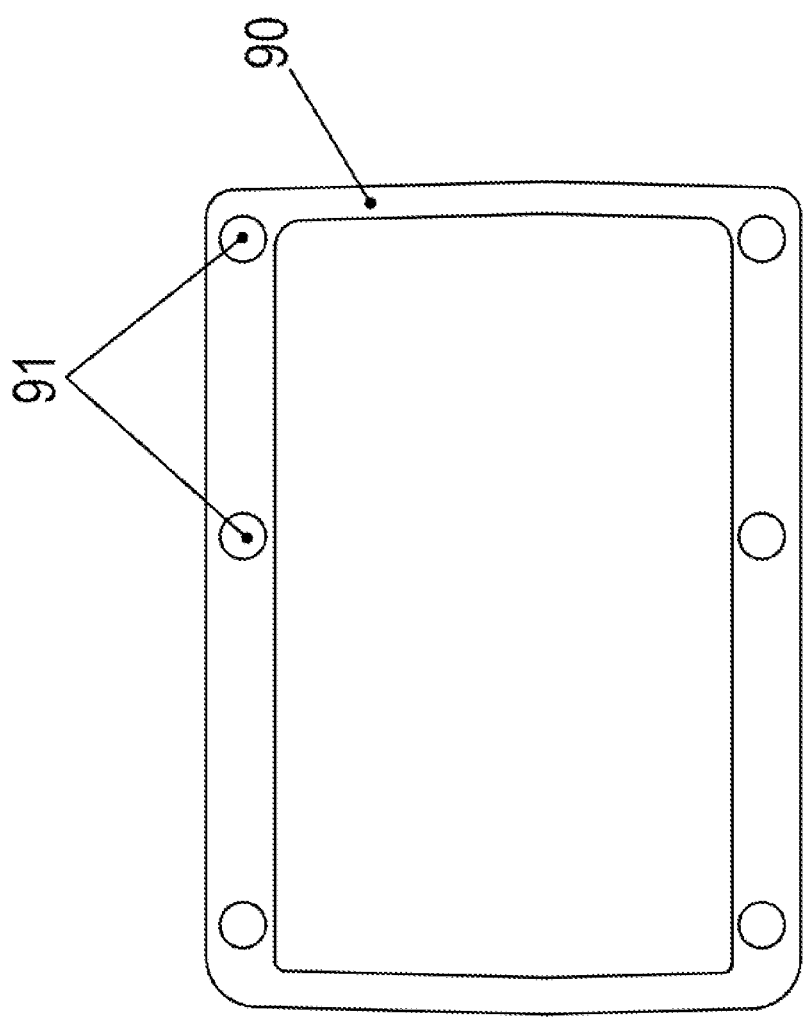
FIG. 10 is an associated top view of flat seal 90.

This ensures high stability and robustness of the gear unit. In addition, a flat seal 90 is interposed in the region of the connection surface, which is illustrated in FIGS. 9 and 10 in greater detail.

As illustrated in FIG. 7, the upper side of the gear unit cover has a planar drilling surface region 72 into which an uninterrupted stepped bore is introduced so that screw 71 rests against the step of the stepped bore by its screw head and its threaded region is introduced into a threaded bore of housing part 1. The threaded bore and the blind bore are aligned with each other and both are therefore aligned in parallel with the drawing direction of the second slider.

To produce the threaded bore, a wedge is placed under housing part 1 and the threaded bore is then introduced into the connection surface. The wedge angle of the wedge is similar to the angle of inclination and/or the slant of the drawing direction of the second slider.

Figure 8:
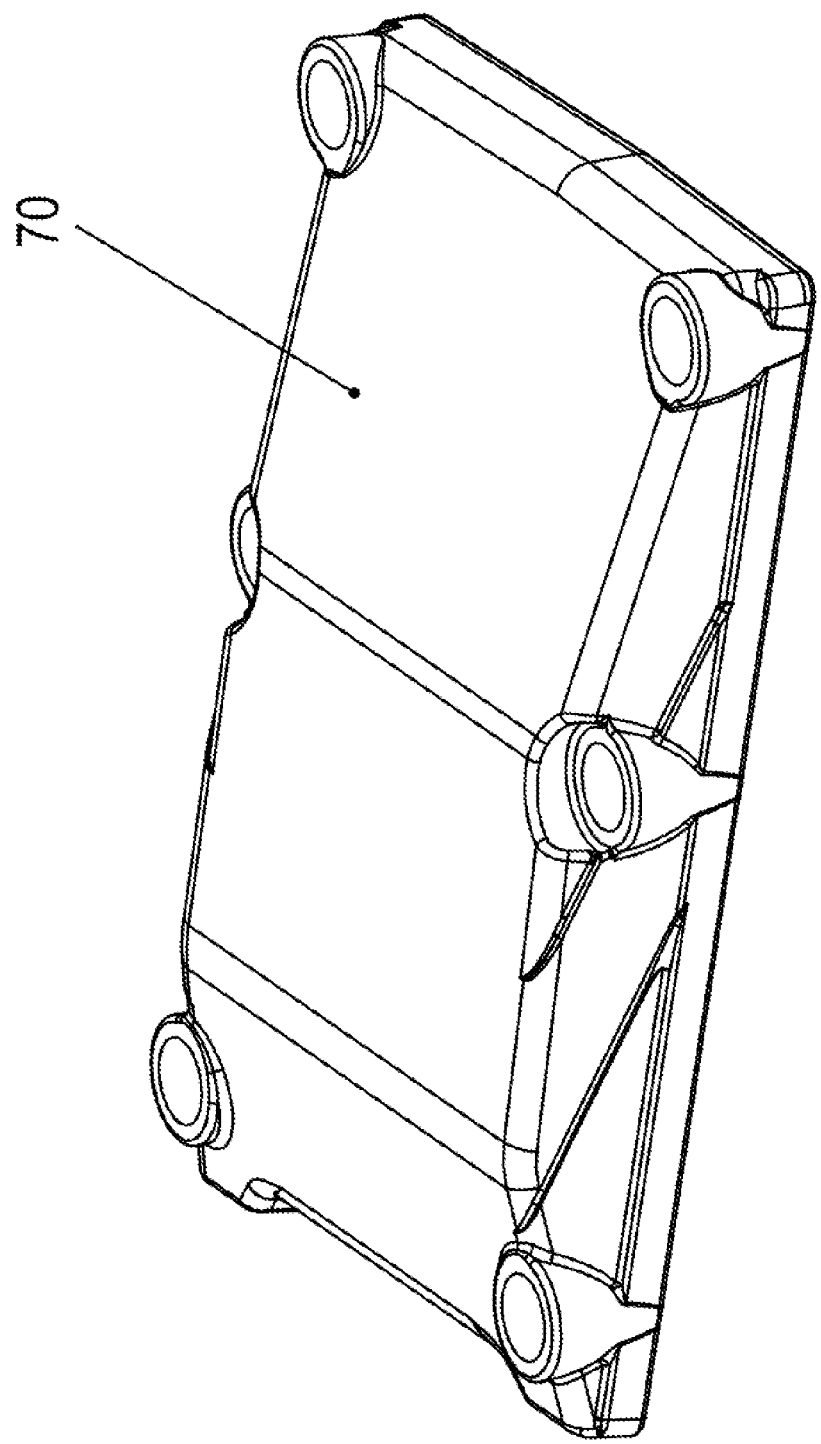
FIG. 8 is a perspective view of gear unit cover 70.

FIG. 8 is a perspective view of gear unit cover 70.

FIGS. 9 and 10 illustrate flat seal 90 together with uninterrupted, circular, i.e., in particular, cylindrical, recesses 91 through which screws 71 are guided when gear cover 70 is placed on housing part 1, despite the fact that screws 71 are aligned at an angle, i.e., have a non-vanishing angle to the normal direction of the connection surface.

Figure 11:
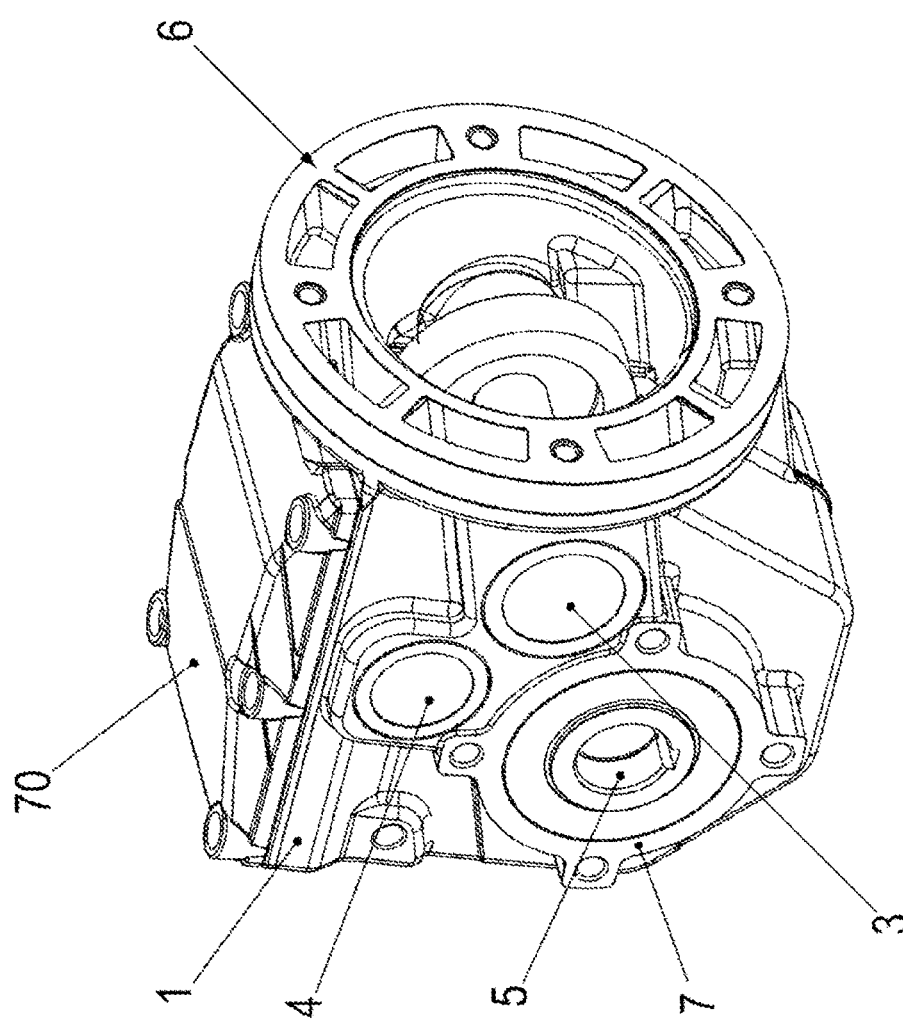
FIG. 11 is a perspective view of the gear unit.
Figure 12:
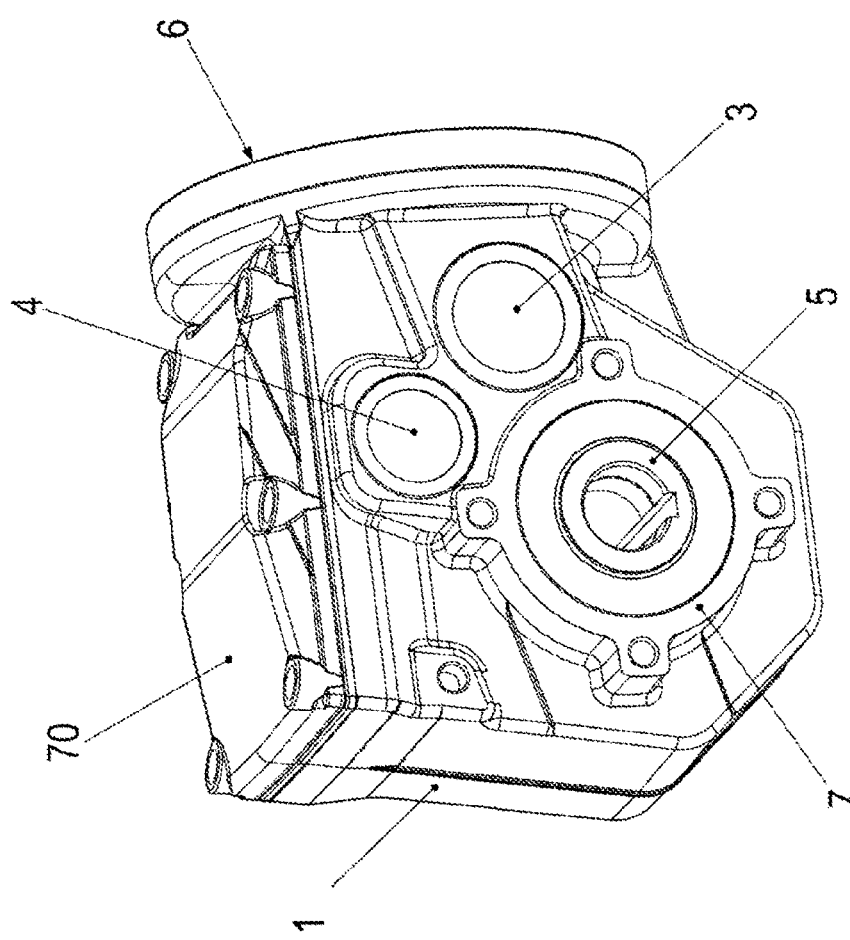
FIG. 12 is a perspective view from a different viewing direction.

FIGS. 11 and 12 illustrate the gear unit from different viewing directions. Once again, the oblique alignment of the drawing direction of the first slider is illustrated along with the oblique alignment of the drawing direction of the second slider.

Figure 13:
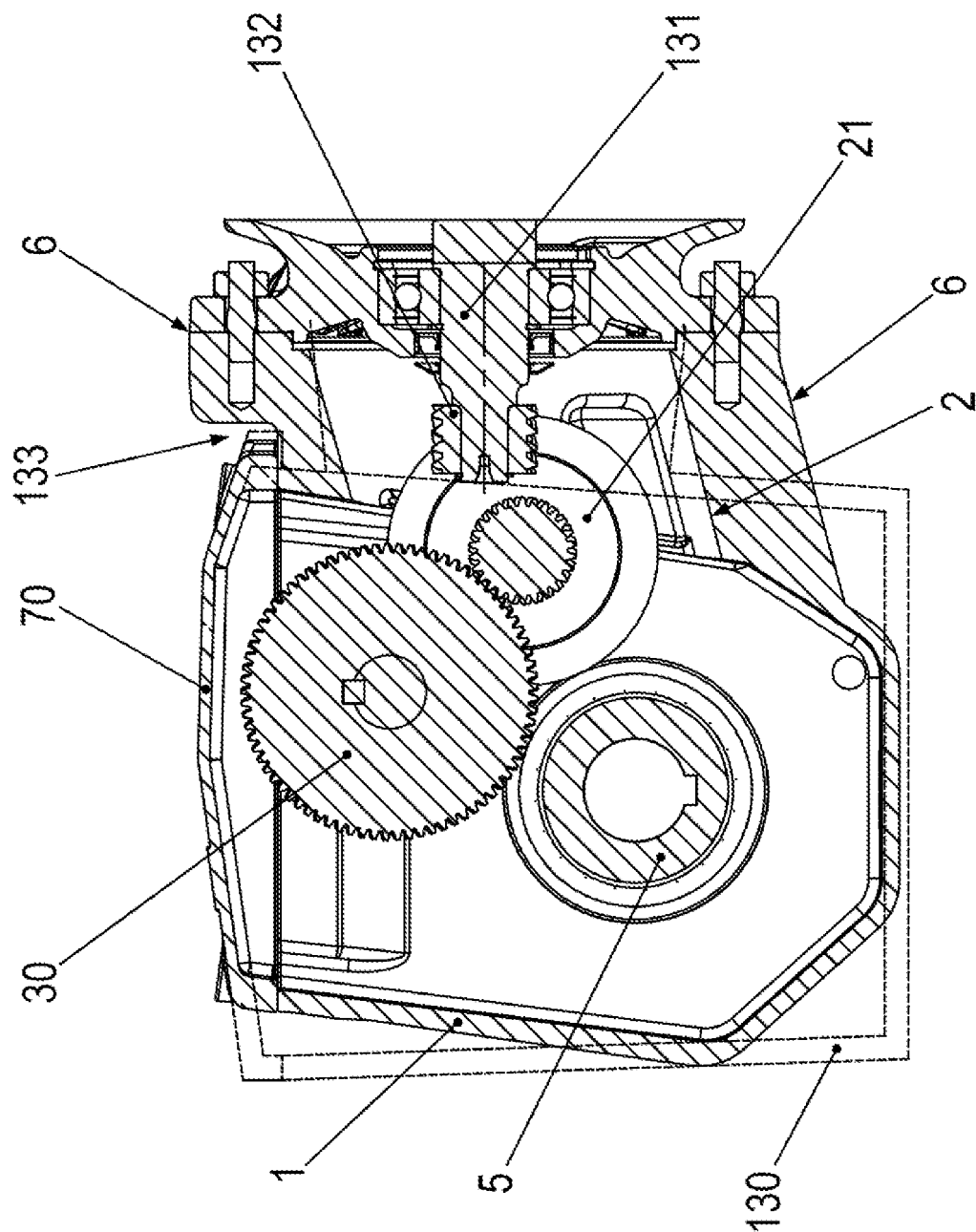
FIG. 13 is a cross-sectional view through housing part 1 produced using an oblique direction, a housing part which is produced without the oblique direction being indicated by dashed lines.

FIG. 13 is a cross-sectional view through the gear unit including housing part 1, the corresponding cross-section through another housing part in whose production the drawing directions are not oblique but are aligned in parallel with one another or are aligned at an angle amount of 90° relative to one another.

In the exemplary embodiment illustrated in FIG. 13, the rotor shaft of the electric motor is arranged as input shaft 131, which is connected in a torsionally fixed manner to pinion 132, which meshes with ring gear 21 of first intermediate shaft 20 of the gear unit.

The ring gear projects into channel 2. In particular, the orthogonal projection of the axis of rotation of the ring gear clearly lies inside channel 2, in particular, at the lower edge of channel 2.

Indicated by dashed lines 130 is an imaginary housing part without an oblique drawing direction. In comparison with imaginary housing part 130, it is clear that housing cover 1 may be arranged in shortened form. The housing opening is kept as small as possible. Gear unit cover 70 may have a shorter configuration.

The arrangement of housing part 1 as an aluminum die cast component results in a reduced total weight in comparison with a configuration made of steel.

A constriction 133 is present between gear unit cover 70 and flange region 6, which complicates or prevents varnishing in the dashed variant. According to example embodiments of the present invention, or in other words, when using the oblique drawing directions, the clearance between flange region 6 and gear unit cover 70 is enlarged so that the constriction does not constitute a risk but allows for easy varnishing. In addition, an accumulation of dirt at constriction 133 is made more difficult and the cleaning is easier because more space is available.

The channel wall and the bearing seat, i.e., the input and output region, may have a reinforced form arranged as a result of the oblique drawing directions hereof. This is considered particularly advantageous because the gear unit functions as a shaft-mounted gear unit, i.e., is held by the non-rotatably situated region of a load to be driven by the gear unit. A load to be driven is able to be axially connected on both sides on the output shaft. On the one hand, a torsionally fixed connection between a rotating part, in particular, a solid shaft section, of the load to be driven and the hollow shaft is to be implemented for this purpose. In addition, the non-rotatably situated region of the load to be driven also has to be connected to the housing part.

To this end, the same mechanical interface is provided on housing part 1 axially on both sides. This interface has a centering device 9 such as a centering edge or centering collar on the one hand, and a drilling pattern for connection screws on the other hand. This interface is symmetrically aligned with plane 42 in FIG. 4, counter to the housing wall.

As a result, the load is connectable to housing part 1 using the same drilling pattern, optionally coming axially from the front or coming axially from behind.

Reference character D in FIG. 14 denotes the orthogonal projection of the axis of rotation of first intermediate shaft 20 into plane E; reference character E denotes the plane, in particular, a plane, that is aligned in parallel with the drawing direction of channel 2; reference character K1 denotes the orthogonal projection of the outermost outlet of channel 2 into the gear unit interior space; and reference character K2 denotes the orthogonal projection of the outermost outlet of channel 2 in the direction of the environment.

LIST OF REFERENCE CHARACTERS

1 housing part
2 channel
3 cover part, e.g., a sealing cap
4 cover part, e.g., a sealing cap
5 output shaft
6 input-side flange region
7 output-side flange region 20 intermediate shaft
21 toothed part, e.g., a ring gear
22 tooth system
30 further tooth part
40 first region of housing part 1
41 second region of housing part 1
42 plane
70 gear unit cover
71 screw, e.g., a connection screw
72 planar drill surface region
90 flat seal
91 recess
130 imaginary housing part given a non-oblique drawing direction
131 input shaft
132 pinion
133 region of the constriction
D perpendicular projection of the axis of rotation of the first intermediate shaft 20 into plane E
E plane, e.g., a plane which is aligned in parallel with the drawing direction of channel 2
K1 perpendicular projection of the outermost outlet of channel 2 into the gear unit interior space
K2 perpendicular projection of the outermost outlet of channel 2 in the direction of the environment

What is claimed is:

1. A geared motor, comprising:
a gear unit including a housing part having an asymmetrical configuration such that a plane whose normal direction is aligned in parallel with an axis of rotation of a first intermediate shaft, arrangeable in parallel with an output shaft and mountable via bearings in the housing part, and includes an axis of rotation of an input shaft, is not a plane of symmetry in relation to an entire outer surface of the housing part, is not a plane of symmetry in relation to a housing wall of the housing part, and is a plane of symmetry with respect to two connection surfaces, set apart from each other and at which a device and/or a machine adapted to be driven by the gear unit is connectable to the gear unit, and drilling patterns of the connection surfaces;
wherein the housing part is asymmetrical such that a toothed part and/or a gear wheel connected to the output shaft of the gear unit in a torsionally fixed manner is set apart from the plane.

2. The geared motor according to claim 1, wherein the gear unit is adapted to be driven by an electric motor and includes the first intermediate shaft rotatably mounted via the bearings in the housing part, the input shaft, and the output shaft arranged in parallel with the first intermediate shaft.

3. The geared motor according to claim 1, wherein the gear unit is arranged as a bevel gear unit.

4. The geared motor according to claim 1, wherein the drilling pattern is adapted for connection screws to connect a respective device to the gear unit.

5. The geared motor according to claim 1, wherein the housing part has a first drilling pattern on a first outer side and a first centering device, the housing part having a second drilling pattern on a second outer side and a second centering device, the first and second outer sides being axially set apart from each other in relation to the axis of rotation of the output shaft, the first and second drilling patterns being of a same type and/or the first and second centering devices being of a same type, the first and second outer sides with the first and second drilling patterns being symmetrical in relation to the plane.

6. The geared motor according to claim 5, wherein the first centering device and/or the second centering device includes a centering collar, a centering edge, and/or a centering groove.

7. The geared motor according to claim 5, wherein the first and second drilling patterns are identical.

8. The geared motor according to claim 5, wherein the first and second centering devices are identical.

9. The geared motor according to claim 5, wherein the output shaft is arranged as a hollow output shaft, and wherein (a) a first axial end region of the hollow shaft is adapted to connect in a torsionally fixed manner to a first part of a load to be driven, and the housing part at the first drilling pattern and the first centering device is adapted to connect to a second part, rotatable with respect to the first part, of the load to be driven and/or (b) a second axial end region of the hollow shaft is adapted to connect in a torsionally fixed manner to the first part of the load to be driven, and the housing part at the second drilling pattern and the second centering device is adapted to connect to the second part of the load to be driven.

10. The geared motor according to claim 1, wherein a greater portion of a volume of an interior space region of the gear unit is arranged on a side of the plane facing the toothed part than is arranged on a side of the plane facing away from the toothed part.

11. The geared motor according to claim 1, wherein the output shaft is axially accessible from both sides and/or projects from the housing part.

12. The geared motor according to claim 1, wherein the output shaft is arranged as a hollow shaft.

13. The geared motor according to claim 1, wherein the housing part is arranged as an aluminum die cast part.

14. The geared motor according to claim 1, wherein the housing part has a first mechanical interface, that includes a first one of the connecting surfaces and a first one of the drilling patterns, and a second mechanical interface, that includes a second one of the connecting surfaces and a second one of the drilling patterns, for a load to be driven by the gear unit axially on both sides of the output shaft, the first mechanical interface and the second mechanical interface being the same.

15. The geared motor according to claim 14, wherein the load to be driven by the gear unit is to be driven by the output shaft.

16. The geared motor according to claim 14, wherein the first interface is provided on the housing part for connection to a load to be driven by a front axial end region of the output shaft, and the second interface is provided on the housing part for connection to a load to be driven by a rear axial end region of the output shaft, the first interface and the second interface being identical.

17. The geared motor according to claim 16, wherein the first and second interfaces are arranged symmetrical with the plane.

18. The geared motor according to claim 14, wherein each drilling pattern is arranged on the housing part and each of the interfaces includes a centering device arranged on the housing part.

19. A geared motor, comprising:
a gear unit including a housing part having an asymmetrical configuration such that a plane whose normal direction is aligned in parallel with an axis of rotation of a first intermediate shaft, arrangeable in parallel with an output shaft and mountable via bearings in the housing part, and includes an axis of rotation of an input shaft, is not a plane of symmetry in relation to an entire outer surface of the housing part, is not a plane of symmetry in relation to a housing wall of the housing part, and is a plane of symmetry with respect to two connection surfaces, set apart from each other and at which a device and/or a machine adapted to be driven by the gear unit is connectable to the gear unit, and drilling patterns of the connection surfaces;

wherein the housing part is produced by a pressure die casting method, during or after which sliders are moved and/or pulled out in respective drawing directions for demolding, the housing part including a channel, demolded in a first drawing direction using a first slider, the channel extending through a wall of the housing and ending in an interior space region of the gear unit, the drawing direction having an angle in relation to the axis of rotation of the input shaft between 5° and 45°.

20. The geared motor according to claim 19, wherein the gear unit is arranged as a bevel gear, a tooth system connected to the input shaft in a torsionally fixed manner meshing with a tooth system of a ring gear, the ring gear being connected to a first intermediate shaft of the gear unit in a torsionally fixed manner, an orthogonal projection of an axis of rotation of the first intermediate shaft onto a drawing direction and/or onto a plane including the drawing direction being included in a region covered by an orthogonal projection of the channel onto the drawing direction and/or onto the plane including the drawing direction.

21. The geared motor according to claim 19, wherein an inner diameter of the channel is larger than a largest outer diameter of the ring gear.

22. The geared motor according to claim 19, wherein the housing part has a region demolded in a second drawing direction, using a second slider, the second drawing direction having an angle to the normal direction of the plane defined by the axis of rotation of the input shaft and an axis of rotation of a first intermediate shaft ranging from 5° to 45°.

23. The geared motor according to claim 19, wherein the channel extends through a flange region of the gear unit, the gear unit is connected to the electric motor at the flange region, the gear unit holding the electric motor.

24. The geared motor according to claim 22, wherein the housing part is connected to a gear unit cover, a connection surface having a planar configuration, the gear unit cover being screw-connected to the housing part, the connection surface being parallel to the axis of rotation of the input shaft and parallel to the axis of rotation of the intermediate shaft, the screws and/or a helix axis direction of the screws being aligned in parallel with the second drawing direction, a flat seal being arranged between the housing part and the gear unit cover.

25. The geared motor according to claim 24, wherein a respective screw is arranged through a respective stepped bore of the gear unit cover and screwed into a respective threaded bore by a threaded region, the stepped bore and the threaded bore being aligned in parallel with the second drawing direction, a screw head of the respective screw resting in a planar fashion against a cover surface and/or against a step of the respective stepped bore.

26. The geared motor according to claim 25, wherein the stepped bore is arranged in a planar surface region of the gear unit cover, a normal direction of the planar surface region being aligned in parallel with the second drawing direction.

27. The geared motor according to claim 19, wherein the housing part has a region demolded in a second drawing direction, using a second slider, the second drawing direction having an angle to the normal direction of the plane defined by the axis of rotation of the input shaft and an axis of rotation of a first intermediate shaft ranging from 5° to 20°.

28. A geared motor, comprising:
a gear unit including a housing part having an asymmetrical configuration such that a plane whose normal direction is aligned in parallel with an axis of rotation of a first intermediate shaft, arrangeable in parallel with an output shaft and mountable via bearings in the housing part, and includes an axis of rotation of an input shaft, is not a plane of symmetry in relation to an entire outer surface of the housing part, is not a plane of symmetry in relation to a housing wall of the housing part, and is a plane of symmetry with respect to two connection surfaces, set apart from each other and at which a device and/or a machine adapted to be driven by the gear unit is connectable to the gear unit, and drilling patterns of the connection surfaces;
wherein the housing part is produced by a pressure die casting method, during or after which sliders are moved and/or pulled out in respective drawing directions for demolding, the housing part including a channel, demolded in a first drawing direction using a first slider, the channel extending through a wall of the housing and ending in an interior space region of the gear unit, the drawing direction having an angle in relation to the axis of rotation of the input shaft between 5° and 20°.

* * * * *